United States Patent [19]

Brode et al.

[11] Patent Number: 4,578,448
[45] Date of Patent: Mar. 25, 1986

[54] HIGH-ORTHO PHENOL-FORMALDEHYDE RESOLES CONTAINING HEMIFORMAL GROUPS

[75] Inventors: George L. Brode; Sui-Wu Chow, both of Bridgewater Twp., Sommerset Co., N.J.

[73] Assignee: Union Carbide Corporation, Danbury, Conn.

[21] Appl. No.: 561,144

[22] Filed: Dec. 14, 1983

Related U.S. Application Data

[63] Continuation of Ser. No. 340,853, Jan. 20, 1982, abandoned.

[51] Int. Cl.$^4$ ............................................. C08G 8/10
[52] U.S. Cl. .................................... 528/139; 425/543; 525/480; 528/140; 528/150; 528/153; 528/154; 528/165; 528/155
[58] Field of Search ............... 528/165, 139, 140, 150, 528/153, 154, 155; 525/480; 425/543

[56] References Cited

U.S. PATENT DOCUMENTS

| | | | |
|---|---|---|---|
| 3,485,797 | 12/1969 | Robins | 528/165 X |
| 4,036,816 | 7/1977 | Vasishth et al. | 528/139 X |
| 4,120,847 | 10/1978 | Culbertson | 528/140 |
| 4,140,845 | 2/1979 | Vasishth | 528/140 X |
| 4,157,324 | 6/1979 | Culbertson | 528/140 X |
| 4,235,989 | 11/1980 | Leong | 528/139 |
| 4,264,671 | 4/1981 | Gillern et al. | 528/140 X |
| 4,269,754 | 5/1981 | Lang et al. | 525/480 X |
| 4,311,619 | 1/1982 | Seeney et al. | 528/165 X |
| 4,395,520 | 7/1983 | Chow et al. | 525/502 |
| 4,395,521 | 7/1983 | Chow et al. | 525/502 |
| 4,403,066 | 9/1983 | Brode et al. | 524/876 |
| 4,427,800 | 1/1984 | Nakamura et al. | 528/165 X |
| 4,430,473 | 2/1984 | Brode et al. | 524/492 |
| 4,433,119 | 2/1984 | Brode et al. | 425/543 X |
| 4,433,129 | 2/1984 | Brode et al. | 528/154 |

FOREIGN PATENT DOCUMENTS 668360 11/1965 Belgium .

OTHER PUBLICATIONS

Paint/Coatings Dictionary (Fed. of Societies for Coatings Technology), 1978, pp. 391 & 426.
Organic Coating Technology, pp. 602–603, John Wiley and Sons, Inc., 1954, vol. I, Payne.
J. of Polymer Science, part (A), vol. 3, 1965, pp. 1079–1106, Woodbrey et al.
Walker, Formaldehyde, 3rd Edition, 1964, pp. 305–306.
Baekeland et al., Industrial & Engineering Chemistry, vol. 17, No. 3, pp. 225–237 (1935).
Strupinskaya et al., Plast. Massy, 1968 (12), pp. 18–20.

*Primary Examiner*—Howard E. Schan
*Attorney, Agent, or Firm*—Morris N. Reinisch

[57] ABSTRACT

Disclosed are high-ortho phenol-formaldehyde resoles having stable hemiformal groups. These resoles are of low viscosity, are essentially free of unbound water and volatile organic compounds. They are curable to phenolic formaldehyde resinous solids and are particularly suitable for use in liquid injection molding processes to form composites.

13 Claims, No Drawings

HIGH-ORTHO PHENOL-FORMALDEHYDE RESOLES CONTAINING HEMIFORMAL GROUPS

This is a continuation of prior U.S. application Ser. No. 340,853 filed Jan. 20, 1982, now abandoned.

This invention is directed to a polymerizable high-ortho phenol-formaldehyde resin that has hemiformal groups incorporated into its structure. These resins are of low viscosity and are essentially free from unbound water and volatile organic solvents. They are particularly useful for use in liquid injection molding techniques.

Until recently, liquid hemiformal compositions of phenol have been generally unknown although there has been speculation in the literature about hemiformals of phenol for some time.

Illustrative of such literature is Walker, FORMALDEHYDE, 3rd Edition, published by Reinhold, Publishing Corporation, New York, (1964), pages 305, 306 wherein the following is stated:

"In the absence of added catalysts, anhydrous formaldehyde and paraformaldehyde dissolved in molten phenol without apparent reaction to give clear, colorless solutions which smell strongly of formaldehyde. In such solutions, it is probably that some solvation takes place and hemiformals, such as $C_6H_5OCH_2OH$, $C_6H_5OCH_2OCH_2OH$, etc., are present. However, studies of formaldehyde polymers have demonstrated that phenol is a solvent for these compounds and the majority of the dissolved formaldehyde in phenolic solutions may be in the polymerized state. Studies by Fitzgerald and Martin[44] involving the measurement of hydroxyl ion concentrations in dilute, alkaline, aqueous formaldehyde in the presence and absence of the sodium phenolate of mesitol indicate that hemiformal concentrations are too small to be measured in this way. However, in our opinion hemiformal formation with a hindered phenol, such as mesitol, would be similar to hemiformal formation with tertiary butyl alcohol which does not show any appreciable solvation of formaldehyde. There is a definite analogy of nonaqueous phenol formaldehyde solutions to solutions of formaldehyde in alcohols and other polar solvents. According to Reychler[102], a small percentage of sodium phenolate catalyzes the solution of linear formaldehyde polymers in phenol, just as sodium alcoholates catalyze solution in methanol, ethanol, and other alcohols. That hemiformals are produced is also indicated by the isolation of methyl phenyl formal from an acid-catalyzed reaction of phenol with formaldehyde solution containing methanol[20].

[44]Fitzgerald, J. S., Martin, R. J. L., Australian J. Chem. 8, 194–214 (1955).
[102]Reychler, A., Bull. Soc. Chim. (40) 1, 1189–95 (1907), Chem Abs. 2 p. 1266 (1908).
[20]Breslauer, J. Pictet, A. Berichte, 40 3785 (1907).

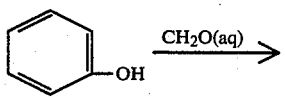

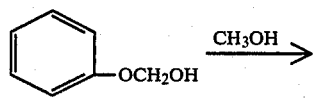

-continued

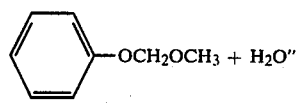

One of the difficulties with the conclusion which is raised in the Walker article is that the hemiformal is produced from an acid-catalyzed reaction of phenol with formaldehyde solution containing methanol. It is notoriously well known that acids act to catalyze the reaction of phenol with formaldehyde to effect normal alkylation of phenol by formaldehyde to produce the phenolic resins. Thus what is seen by Walker as a suggestion of the existence of the hemiformal may be nothing more than the known reaction between methanol and formaldehyde in the presence of an acid catalyst to form a product which is subsequently reacted with phenol to yield the ether product which is characterized as the final product of the reaction. Actually a reaction between formaldehyde and phenol to produce the hemiformal would have yielded an equilibrium reaction and this is totally absent from the reaction characterized by Walker; suggesting again that in the theoretical reaction suggested by Walker the formaldehyde is first stabilized with methanol and then the product is reacted with phenol.

Bakeland and Bender in an article in "Industrial and Engineering Chemistry" Volume 17, No. 3, pages 225–237 (1925) make the following statements concerning the formation of a theoretical hemiformal of phenol:

"The phenol first unites directly with the aldehyde to form a mixed ether-alcohol compound (XXXIII), and the resulting ether group very rapidly rearranges to the phenol.

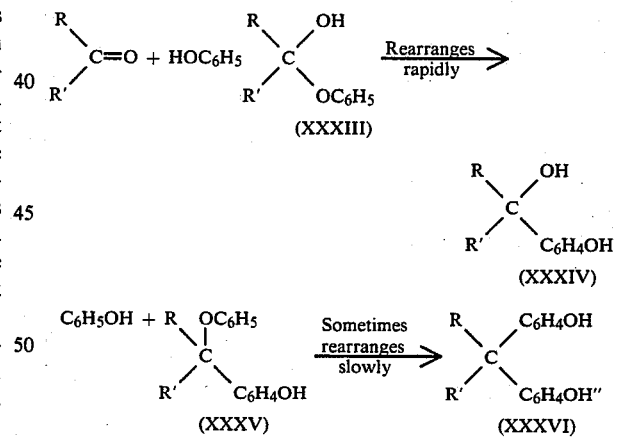

Thus, Bakeland and Bender clearly indicate that if the hemiformal exists it is at best a transitory material which is unstable under the conditions at which it was produced and is a theoretical composition constituting an intermediary in the generation of phenolic resins.

Strupinskaya et al. in Plast. Massy 1968 (12), at pp 18–20 described the preparation of a product by the absorption of formaldehyde into molten phenol at a formaldehyde to phenol ratio of 3:10. This corresponds to a formaldehyde to phenol mole ratio of 0.94:1. The source of formaldehyde was a converter gas stream containing about 10% methanol and analysis of the product showed it to contain up to 8% methanol. The presence of methanol suggests that this reference refers to a methanol stabilized product similar to that disclosed in Walker, cited above, wherein formaldehyde reacts with methanol and subsequently reacts with phenol to form the ether product. The low formaldehyde to phenol ratio also suggests that hemiformals having formaldehyde to phenol ratios higher than 1:1 would likely not have been formed in this process.

In Belgium Pat. No. 667,360 issued on Nov. 16, 1965 to Chemische Werke Huels A. G. is disclosed treatment of various hydroxy-compounds, including phenol, with monomeric formaldehyde, at a formaldehyde to phenol ratio of 1:1. The low phenol to formaldehyde ratio would suggest that any hemiformal formed would have no more than one formaldehyde moiety in the hemiformal chain structure. As cited in Bakeland and Bender, cited above, hemiformals are known in the art as transitory or unstable species and would be expected by one of ordinary skill to be increasingly unstable as the length of the hemiformal chain increases. It would, therefore, be expected that additional formaldehyde added in the Huels process would react with the phenol at another site on the aromatic ring, such as at the para or ortho-position, rather than forming hemiformals with higher formaldehyde to phenol ratios. A person skilled in the art would normally expect that hemiformal compositions having formaldehyde to phenol ratios greater than 1:1, wherein hemiformal chains having more than one formaldehyde moiety are formed, would be unstable, forming other phenol-formaldehyde resinous products or disassociating to form free formaldehyde.

U.S. Pat. No. 3,485,797, issued Dec. 23, 1969, to Robins discloses a high-ortho phenol-formaldehyde resin having a low viscosity and having the general formula:

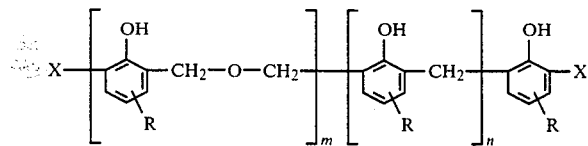

wherein R is a substituent in the meta position to the hydroxyl group, X is a hydrogen or a methylol, the sum of m and n is at least 2, the ratio of m to n is at least 1 and the ratio of hydrogen to methylol for the X group is at least 1. These resins are disclosed to contain —CH$_2$OH, —CH$_2$O—CH$_2$— and —CH$_2$— groups. In the disclosure of the general formula and the results of the analysis of the compositions made in the examples, there is no showing or recognition of hemiformal groups in the resin structure. Thus, the resin here disclosed is similar to conventional phenol-formaldehyde resole resins, in that it contains no hemiformal groups.

In copending U.S. applications Ser. No. 340,719 filed 1-19-82, to Covitz, Brode and Chow and Ser. No. 340,790 filed 1-19-82 to Brode and Chow, are disclosed hemiformals of phenol and methylolated phenol wherein hemiformal groups are formed at the phenolic hydroxy and methylol groups of a phenol molecule. These hemiformals are stable and are of low viscosity and are useful in liquid injection molding processes.

It has now been found that phenol-formaldehyde polymeric resins can be formed that have stable hemiformal groups incorporated into their structure. These resins are high-ortho, namely, the phenol moieties of these resins are linked by methylene and methylol ether linkages, principally at the ortho position. Due in large part to the presence of the hemiformal groups and the high linearity attributable to the high proportion of ortho- ortho-linkages, these polymers are of low viscosity and are particularly suitable for use in liquid injection molding processes such as liquid injection molding (LIM), reaction injection molding (RIM), hydrajecting, and resin transfer molding (RTM) wherein liquid thermosetting compositions are injected directly into a mold where they are cured; resulting formation of a fabricated part.

The compositions of this invention are also adaptable to the sheet molding compound method (SMC), wherein a resin, reinforcing fiber and other additives are mixed under low shear conditions and the resulting viscous mixture cured to non-tacky sheets. Final cure to finished parts is then carried out in a mold.

These processes are rapid and adaptable to high speed production requirements, and since the curing reaction is generally exothermic, these processes are less energy intensive than the traditional methods for processing thermosets. Furthermore, because these relatively new thermoset fabrication methods are low pressure processes, there is required considerably lower clamping forces than those required for the injection molding of engineering plastics, and thus lower capital and operating expenditures are required.

However, attempts to use these processes in fabrication of composites of condensation products such as conventional phenolic resins have resulted in difficulties arising due to a high viscosity or to residual unbound water and volatile hydrocarbon impurities. A high viscosity leads to mixing problems with the reinforcing material resulting in fiber attrition and inadequate wetting of the fibers. The presence of water, solvents or volatile impurities in the resin necessitates greater clamping forces on the mold during the curing step, thus negating in part the advantages of the injection processes.

Phenolic composites are known for their high temperature mechanical strength, flammability resistance and solvent resistance. Therefore, a liquid phenolic composition free of solvents such as water and volatile organic compounds and having low enough viscosity for liquid injection molding processes would be highly desirable.

The compositions of the invention are stable at storage conditions but are highly reactive at elevated temperatures or and in the presence of acid on base catalysts typically used in aldehyde-phenol polymerization reactions. This reactivity is due in large part to the hemiformal groups which either disassociate to form formaldehyde that can react with the phenol moieties of the resin or rearrange to form a cross linked phenol-formaldehyde resin-solid.

An additional advantage of the compositions of the invention is the low concentration of volatile organic compounds, such as alcohol, unbound water and the reaction products of these with formaldehyde. When the resin is subjected to cure temperatures, these substances form gases such as vapors of water and alcohol byproducts and gaseous formaldehyde, which leads to high mold pressure and voids in the composite. Thus, a low concentration of unbound water and volatile organic compounds reduces the amount of vapor products formed during cure. An advantage is also imparted by the high reactivity of the hemiformal groups, which are generally more reactive toward the forming of a phenolic resin than the formaldehyde compounds of water and alcohols, which as described above, contribute to gas formation. The presence of the highly reactive hemiformal groups, therefore, provides for reaction toward the desired phenolic resin product and less formation of the undesired gaseous formaldehyde when the resin is cured.

The amount of unbound water and volatile organic compounds present in the composition of the invention should be less than 5, preferably less than 2 weight percent, based on the total weight of the composition. Amounts less than 1 weight percent are achievable. By unbound water is meant water that is present as impurity and is distinguished from the water produced from the condensation of phenol and formaldehyde. Volatile organic substances are those that volatilize to form a gas when the resin is exposed to elevated temperatures, about 100° C. These include formaldehyde not incorporated in the methylol groups, hemiformal groups or methylol linkages of the resin. Also included are the solvents typically used to reduce the viscosity of a resin, such as alcohol or aromatic hydrocarbons. Also included are such substances such as methanol that may be introduced as contaminants in the formaldehyde or phenol used in manufacture of the resin. Removal of water from phenolic type resins to a low concentration typically results in resins of high viscosity, many being solid or nearly solid, rendering them unsuitable for liquid injection processes. Thus the low viscosity composition of the invention having a low unbound water content is an advance in the art.

The high-ortho structure of the resin also allows the para-position of the phenol moieties to be free. The para-position is more reactive than the ortho-position in condensation and crosslinking reactions. therefore, having a higher proportion of free para-positions allows for resins of the invention having a higher reactivity. The high-ortho resins of the invention are of the formula:

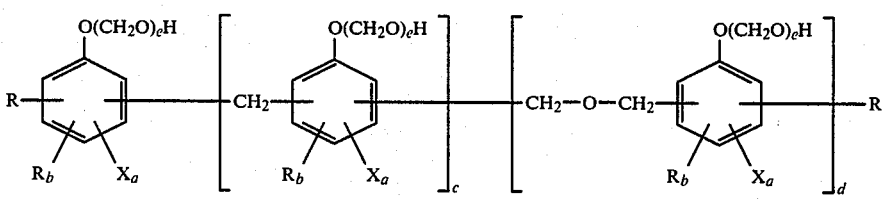

wherein a is from 0 to 3, b is 0 to 1, the sum of a and b does not exceed 3, the sum of c and d is from 2 to about 20, the mole fraction d/(c+d) is 0.4 to 0.9, preferably 0.6 to 0.8, R is —CH$_2$O(CH$_2$O)$_e$H, e is 0 to about 5, X is a monovalent radical, wherein for at least one of the R or —O(CH$_2$O)$_e$H groups e is at least 1 and wherein at least 50 mole percent of the

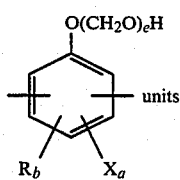 units

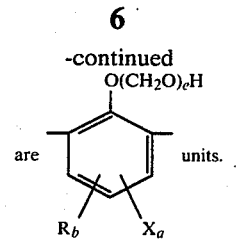 are units.

The above values are average values and an actual composition of the invention will be an equilibrium mixture. X is any substituent typically employed in conjunction with a phenolic structure. With respect to X, it is preferably a monovalent radical which includes alkyl of from about 1 to about 18 carbon atoms, cycloalkyl from 5 to 8 carbon atoms, aryl containing from 1 to about 3 aromatic rings, aralkyl, alkaryl, alkoxy containing from 1 to about 18 carbon atoms, aroxy containing 1 to 3 aromatic nuclei, halide such as choride, bromide, fluoride, and iodide, alkyl sulphides having from 1 to about 18 carbon atoms, aryl sulphides having from 1 to about 3 aromatic nuclei, and the like.

The compositions of the invention are made by reacting a phenol and formaldehyde under azeotropic distillation conditions in the presence of a divalent metal catalyst. Azeotropic distillation is a process well known in the art and involves the use of a separating agent. The separating agent forms an azeotrope with the overhead product and thereby facilitates separation from the bottoms product. In the present invention a separating agent such as toluene forms an azeotrope with water, thereby facilitating the separation of water from the reacting mixture where the high-ortho resin of the invention is being formed.

Suitable separating agents are well known in the art and include toluene and substances that form an azeotrope with water at a temperature between about 80° and 120° C. at atmospheric pressure and are unreactive with phenols and aldehydes.

The formaldehyde may be introduced to the reaction mixture as aqueous formaldehyde solution or as paraformaldehyde.

Although the composition of the invention is defined in terms of formaldehyde, it is well known in the art that other aldehyde such as acetaldehyde, propionic aldehyde, butylaldehyde and furfural can be substituted for formaldehyde in phenol-formaldehyde-type resins. The use of other aldehydes is, therefore, contemplated in the compositions of the invention. However, in order that hemiformal groups can form, some formaldehyde should be present in the reaction mixture wherein the compositions of the invention are formed. At least 20 mole percent formaldehyde, based on the total moles of aldehyde used, should be sufficient formaldehyde to form the hemiformal groups.

The phenols suitable for use in the invention are phenol per se or substituted phenols or mixtures thereof.

Preferably the mixtures contain phenol. Suitable phenols can be represented by the formula.

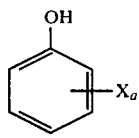

where X and a are defind as above, and wherein at least two of the ortho- and para-positions relative to the hydroxy group are free. Preferably both ortho-positions should be free. Most preferably the substituents should be in the meta-positions only, leaving the ortho- and para-positions free. When using substituted phenols at least 50 mole percent should have both ortho-positions free. Examples of suitable substituted phenols are cresol, isopropylphenols, nonylphenols or dihydric phenols, such as bis-phenol A, bis-phenol F, hydroquinone and resoncinol. Use of substituted phenols will tend to alter the properties of any resulting phenolic resin which is derived from the resulting product, such property changes being of the kind which allows for a maximum variety of phenolic resin product types. For example, a halogen substitution will enhance the flame retardency of the resultant phenolic resin. A aryl-alkyl substitution which contains a hydroxyl group as well, such as bisphenol A, will provide a phenolic resin which is a superior coating resin and will possess better color properties. Also a diphenol such as bisphenol A has an additional phenolic hydroxy group, providing another site for hemiformal production. The substituents will impart those properties to the final cured product that are known in conventional phenol-formaldehyde chemistry.

The total aldehyde to total phenol molar ratio should be from about 1.2:1 to 2:1, preferably 1.5:1 to 1.8:1.

The reaction takes place in the presence of a divalent metal cation such as magnesium, calcium, lead, manganese, strontium, barium, zinc, cadmium or mercury, at a pH of about 3 to 8, preferably from about 4 to 6. Typically, the metal cation is supplied as a salt or as an alkoxide such as a carboxylate salt, or a methoxide or ethoxide of the metal in combination with a mild acid to achieve the desired pH. Suitable salts include the formates, acetates, benzoates, and valerates. Examples of these salts include zinc acetate dihydrate, calcium formate, manganous acetate, lead acetate and zinc benzoate.

The divalent metal salts may be introduced in the initial reaction mixture or they may be generated in situ by combination of their oxides or hydroxides and a carboylic acid. Preferably the salts are soluble in the reaction medium. Typically the concentration of the salt in the medium is about 0.2 to 1 weight percent, preferably about 0.4 to 0.7 weight percent based on the total weight of the reaction mixture.

The reaction is carried out under azeotropic conditions. The pressure should be at a value where an azeotrope is formed between the separating agent and water. Typically, the separating agent is toluene and the pressure is atmospheric which gives a reaction temperature of about 80° to 120° C.

The formaldehyde source is preferably added incrementally or metered into the reaction mixture during the course of the reaction.

The reaction is carried out until the high-ortho resin of the invention begins to form, and essentially all of the separating agents and the water introduced with the reactants and formed during the condensation reaction are removed. Continuing the reaction will, in addition to removing more of the last traces of water and separating agent, cause the viscosity to rise; caused largely by an advance in the molecular weight of the product. Thus, the viscosity of the product can be regulated by the length of the reaction. For use in liquid injection molding methods, the viscosity should be from about 1000 centipoise to about 10000 centipoise (Brookfield at about 25° to 30° C.). For the sheet molding compounds method, the viscosity is not narrowly critical and can be from about 1000 centipoise to about 500,000 centipoise (Brookfield at about 20° to 30° C.). Typically the total reaction time is from about 5 hours to about 8 hours. Final residual water and separating agent may be further removed by use of flash distillation at reduced pressure after the azeotropic distillation is over. Typically, this is carried out at a pressure of about 50 to 100 mm Hg at about 80° to 90° C. for about a half an hour to about one hour.

The use of metal salts as catalysts allows the preparation of these resins under neutral conditions and yields resins which contain largely ortho, ortho-substition between the phenol moieties, i.e. 2.2'-methylene bridges and 2,2'-methylene ether bridges. These structural units are advantageous due to the presence of free para-positions. Since the free para-positions are more reactive than the ortho-positions, the resins are, therefore, more reactive under cure conditions. Also for a given molecular weight, high ortho, ortho-substitution gives resins of lower viscosity than those containing largely ortho, para- and para, para-bridges made under conventional alkaline catalytic conditions. The resins made by the method of this invention are neutral thus they are more stable under ambient conditions to give greater processing latitude.

Additionally, the resins of the invention contain hemiformal groups. During the reaction, formaldehyde reacts with the phenolic hydroxyl group and with methylol groups on the aromatic ring. Generally hemiformals are unstable. It is, therefore, surprising that these hemiformal containing resins are stable at ambient conditions and do not spontaneously react to form higher molecular weight condensation products. By stable, it is meant that at about 25° C. to 30° C. the time required for the viscosity to double is greater than about 200 days. An increase in viscosity indicates condensation into higher molecular weight products. The stability shown by the slow increase here indicated is surprising, considering the presence of the hemiformal groups and the high reactivity of the resin when it is cured.

In addition to the hemiformal groups and the high ortho structure, the resins of the invention also differ from conventional resins in the following respects. Although they are phenol-formaldehyde resole resins in that they are heat reactive without the need of additional curing agent, the resins of the invention contain unbound water or voltatile solvents in very small amounts and do not require the addition of organic solvent to achieve a low viscosity for use in liquid injection molding. By comparison, the heretofore known water free resoles are either solid, having a high molecular weight, are solutions in organic solvents as in resins used for laminates and coatings area or are emulsions with water as the continuous phase. Generally the low molecular weight resoles prepared to data by the conventional alkaline catalyst are aqueous solutions and therefore contain substantial amounts of water. The removal of water without advancing the molecular weight to an unacceptable level cannot be generally economically accomplished in resoles of the prior art. Thus, the invention provides for a water-free resin of low molecular weight and viscosity. The presence of contaminants such as water and other organic volatile compounds is undesirable since it decreases the reactivity of the prepolymer and thus lengthens the mold cycle time in the liquid injection molding process. Also, the presence of excessive amounts of volatile components results in unacceptable high internal mold pressure at cure temperatures resulting in the need for higher clamping force. Thus one of the advantages of the liquid injection molding process is thereby negated.

The liquid phenolic compositions of the invention can be used as thermosetting compositions by curing through the addition of a catalyst and heat. The catalysts can either be an acid or a base depending on the cure rate required for the fabrication technique and formulations chosen. In general, all those catalysts which are commonly employed for the cure of phenol-formaldehyde resins are suitable to cure the high ortho hemiformal containing resins of this invention. Typical acid catalysts are sulfuric acid, sulfonic acids such as phenolsulfonic acid, oxalic acid, and boron trifluoride. Other suitable acid-type catalysts are the latent catalysts disclosed in Ser. Nos. 340,854 and 340,852, both filed 1-20-82, U.S. Pat. Nos. 4,395,520 and 4,395,521. These latent catalysts include certain phenyl esters of carboylic acids that form upon cure a carboxylic acid having a $pK_a$ of about 2 or less. Also included are sulfur dioxide containing compounds that generate sulfur dioxide at cure conditions. Examples of latent catalysts include phenyl hydrogen maleate, phenyl trifluoroacetate and butadiene sulfone. Typical bases are organic amines such as hexamethylenetetramine, trimethylamine, ethanolamines and oxides and hydroxides of metals such as barium and calcium.

Concentration ranges depends on cure rate required and acid or base strength of the catalyst. For a strong acid such as sulfuric acid, the typical concentration range is from 0.01 weight percent to 5 weight percent. For weaker acids or bases concentrations as high as 10–15 weight percent can be employed. The latent catalysts are typically used in an amount from about 0.2 to about 10 weight percent, preferably about 0.5 to about 5 weight percent. The basis of the percentages is the weight of the catalyst free resin. Due to the ease of obtaining a homogeneous polymerizing mixture, catalysts soluble in the liquid resin of the invention are preferred.

If desired, there may be added to the liquid thermosetting phenolic resin composition a reactive diluent such as ethylene glycol, diethylene glycol, ethanolamines, and various drying oil-modified phenols such as the reaction products of linseed, tung and castor oil with phenol. These reactive diluent are useful for the modification of the viscosity and handling characteristics of the uncured resin or for the modification of the properties of the cured compositions. If employed and depending on the reactive diluent used, the reactive diluent may be added at an amount of from about 5 weight percent to about 30 weight percent, based on the combined weight.

Also, if desired, there may be added to these liquid phenolic thermosetting composition, other types of polymers which can co-cure with these reactive compositions. Examples of co-reactive polymers are phenol-formaldehyde resoles, phenol-formaldehyde novolacs, aromatic polyesters, aromatic polycarbonates, unsaturated polyesters, poly(aryl-ethers), urea-formaldehyde resins, and melamine-formaldehyde resins. The use of these additives serves either to modify the properties of the cured product or the handling characteristics of the prepolymer. Examples and chemistry of some of these coreactive polymers are disclosed in U.S. Pat. No. 4,433,119.

The phenolic resin compositions of this invention, which have had catalyst added thereto, are cured by the application of heat. A temperature of from 100° C. to 180° C., preferable from 120° C. to 160° C., most preferably from 140° C. to 155° C., is employed for the cure. The curing time can be regulated by type and concentration of the catalyst and will vary depending on such factors as the particular composition of the thermosetting resin, the type of fabrication process, the configuration of the cure part and other factors known to those in the art. When used in liquid injection molding applications, the cure time is typically greater than 20 seconds, generally from about 1 to about 10 minutes.

One very useful application of the liquid thermosetting phenolic compositions of this invention is in the fabrication of reinforced composites. Heretofore the maximum attainable content of reinforcing material or fiber of such composites has been about 45 weight percent. By employing the liquid compositions of this invention in the fabrication of these composites one can now attain a fiber content of up to about 70 weight percent. In most thermosetting compositions, particularly of the phenolic type, there has been a limitation of the amount of reinforcing fiber that can be added to form composites. This is due in large part to the high viscosity of these compositions, many of which are nearly solid, which necessitates high shear mixing with the reinforcing material and injection under high shear conditions into the mold. This results in significant attrition of the reinforcing material, thus lowering the strength of the final composite. The high viscosity also prevents sufficient wetting of the fiber and mixture with the fiber. This results in composites of poor physical properties and separation of the composites at the site of the fibers. For this reason fiber content of such composites has generally been limited to about 45 weight percent or below.

Since it is desirable to have high reinforcing fiber content in the composites, to obtain the superior physical properties obtainable thereby, a phenolic resin having a low viscosity that can be used to form such high fiber content composites without encountering the problems discussed above, would be very desirable. Through use of the compositions of the invention composites having up to 70 weight percent glass are possible.

Suitable reinforcing materials useful in the composites of the invention include glass fibers, carbon fibers, graphite fibers, wollastonite, cellulousic fibers such as wood flour and the like, organic fibers such as aromatic polyamide fibers, and mica.

The preferred reinforcing materials are glass fibers, carbon fibers, graphite fibers and aromatic polyamide fibers. These fibers may be in any form common to the art such as chopped fiber, mat, and woven cloth. In liquid injection processes the fibers may be introduced into the thermosetting composition by mixing therewith before injection into the mold or preferably, the fiber is placed into the mold and the thermosetting composition is injected thereafter. In sheet molding compounds the fiber may be mixed as chopped fiber prior to the initial cure.

Other additives may be included in the composites of the invention. These include those commonly used in the above molding methods, such as pigments and various processing aids.

In a typical process for forming composites, the phenolic resin composition of this invention, which has had added thereto a catalyst, is injected into a mold containing a predetermined amount of fiberglass. The fiberglass may be in any suitable form, a convenient form being a glass mat. The mold is closed and heated to from 100° to 180° C., preferably from 120° to 160° C., most preferable from 140° to 155° C., for at least 20 seconds, preferably from 1 to 10 minutes, after which it is opened and the hard fiberglass-reinforced thermoset plastic composite is recovered. This composite may contain from 10 to 70 weight percent, preferably 50 to 70 weight percent fiberglass with the remainder being the cured pheonolic resin. In addition to the many advantages offered due to their being of low viscosity and in the liquid state such as greater ease of handling and transport, these liquid uncured compositions are compatible with requirements of modern fabrication techniques such as liquid injection molding and sheet molding processes which allow the fabrication of composites having a higher content of reinforcing material and having improved mechanical strength.

The following examples serve to further illustrate the invention. They are not intended to limit the invention in any way.

In the examples, the following standard evaluation procedures were employed:

| | |
|---|---|
| Flexural Modulus | ASTM D790 |
| Flexural Strength | ASTM D790 |
| Notched Izod (Impact) | ASTM D256 |
| Heat Deflection Temperature (HDT) | ASTM D648 |
| Tensile Modulus | ASTM D638 |
| Tensile Strength | ASTM D638 |
| Elongation | ASTM D638 |

The injection mold device in Examples 8-10 is described in U.S. patent application Ser. No. 135,906, filed Apr. 14, 1980 by Angell.

Examples 1 to 7 illustrate the preparation of various resins of the invention.

EXAMPLE 1

This example illustrates the preparation of a phenol-formaldehyde resin of the invention. Into a 5 gallon vessel equipped with a water separator were charged 7058 grams (75 g moles) of phenol, 35.3 grams of zinc acetate dihydrate and 494 grams of toluene. The solution was stirred and heated to about 100° C., after which 9205 grams of an aqueous solution of formaldehyde containing 48.9 weight percent formaldehyde (150 moles formaldehyde) were metered into the reaction mixture over five hours. There was an initial mild exotherm, which was easily moderated by regulating the source of heat. Water added with the formaldehyde was then removed azeotropically with the toluene using the water separator as a condenser. After all the aqueous formaldehyde solution had been added, the mixture was azeotropically distilled for about 1.5 hours at atmospheric pressure to a temperature of about 108° C. The toluene and water were removed as an azeotropic vapor mixture which was condensed using the water separator. The heat-source was then removed and the distillation continued under a reduced pressure of 50 mm Hg for about half an hour. Total water recovered corresponded to about 100% of the water added in the aqueous formaldehyde solution. The resulting composition had a viscosity (Brookfiled Model RVT) of 3900 cp at 29° C. The molecular weight and molecular weight distribution were anlayzed by gel permeation Chromatography using a Waters Model 200 Gel Permeation Chromatograph. The number average molecular weight was 350 and the weight average molecular weight was 450. Analysis by NMR of the types of bonds the resin product showed the presence of hemiformal groups, arylmethylol groups, arylmethylene ether linkages and arylmethylene linkages.

EXAMPLE 2

A phenolic resin was prepared as in Example 1 except 8420 grams of 48.9 weight percent aqueous formaldehyde solution was used, the aqueous formaldehyde solution was added over 4.5 hours, and the reaction mixture was azeotropically distilled for an additional 1.75 hours. The viscosity (Brookfield Model RVT) of the product was 4200 centipoise and the total water recovered corresponded to 99% of the water added with the aqueous formaldehyde solution.

EXAMPLE 3

A phenolic resin was prepared as in Example 1 except 8752 grams of a 47 weight percent aqueous formaldehyde solution was used, the aqueous formaldehyde solution was added over 4.5 hours, and the distillation was continued under reduced pressure after the heat source was removed for about one hour. The resulting liquid resin had a viscosity of about 2000 centipoise at 26° C. and total water recovered corresponded to 100% of the water added in the formaldehyde solution.

EXAMPLE 4

To a solution of 1410 g (15 moles) of phenol and 7.0 g of zinc acetate dihydrate heated at 85° C., there was added formaldehyde as 200 g of paraform (containing 91 weight percent formaldehyde) to a batch reactor vessel with vigorous stirring. A mild exotherm ensued and the reaction mixture was maintained at 80°-90° C. by cooling with a water bath as needed. After most of the paraform was dissolved which required about 15-20 minutes, additional paraformaldehyde was added over a 5-hour period in about 100 g increments to give a total of 990 g of the 91% paraform (30 mole formaldehyde). When all the paraform had dissolved, about 75 g of toluene was added and a water separator attached. Toluene and water from impurities in paraform and a small amount due to condensation reaction was removed by azeotropic distillation at atmospheric pressure as described in Example 1 until the reaction mixture reached 114° C. which required about 1½ hours. Toluene and residual water and toluene were then removed by flash distillation at 80°-90° C. under a reduced pressure of 50-100 mm Hg for about half an hour. The resulting prepolymer had a viscosity of 53,000 centipoise (Brookfield) at 23° C.

EXAMPLE 5

Phenol (1410 g., 15 mole), diethylene glycol (159 g) and zinc acetate dihydrate (7.0 g) were stirred at 80°–90° C. Paraformaldehyde (paraform) (990 g) was added in small portions as described in Example 4. The paraform contained 91% formaldehyde giving a total of 30 moles of added formaldehyde. When all the paraform was in solution (about 5 hours), toluene (75 g) was added. Water was removed by azeotropic distillation at atmospheric pressure until the reaction reached 110° C. which required about 5 hours. Residual toluene and residual water were then removed by flash distillation at 80°–90° C. at a reduced pressure of 50–100 mm. Hg for about 0.5 hours. The viscosity of the resulting liquid composition was about 10,900 centipoise (Brookfield) at 24° C. and 2,600 centipoise (Brookfield) at 27° C.

EXAMPLE 6

This example illustrates preparation of a p-cresol modified phenolic resin.

To a solution of phenol (1269 g, 13.5 moles), p-cresol (108 g., 1.5 moles) and 7.5 g of zinc acetate dihydrate at 80°–90° C. was added incrementally 990 g (30 moles) of 91% paraformaldehyde by the method described in Example 4. Toluene (75 g) was added as in Example 4. Water and toluene were removed by azeotropic distillation and flash distillation under reduced pressure as described in Examples 4 and 5. The viscosity of the resulting liquid prepolymer was about 13,400 centipoise (Brookfield) at about 20°–25° C.

EXAMPLE 7

This example illustrates preparation of a furfural modified resin.

A solution of 940 g of (10 moles) of phenol, 96.08 g (1 mole) of furfural and 4.7 g of zinc acetate dihydrate and 50 g of toluene was stirred and heated at 80°–90° C. Paraformaldehyde (495 g) divided into 10 equal portions, was added a portion at a time over 4 hours. The paraform contained 91 weight percent formaldehyde to give a total of 15 moles of added formaldehyde. Water and toluene were removed using azeotropic distillation followed by a flash distillation as described in Examples 4 and 5. The resulting product had a viscosity of 30,000 centipoise (Brookfield) at 20° C., 1150 centipoise (Brookfield) at 50° C. and 480 centipoise (Brookfield) at 60° C.

EXAMPLES 8–10

These examples illustrates use of the compositions of the invention in molding via a liquid injection process.

The liquid resin described in Example 1 was thoroughly mixed with a latent catalyst and injected by means of a injection device into a mold. The catalyst was a phenyl hydrogen maleate and was prepared by mixing an excess of phenol with maleic anhydride. The catalyst was present at a concentration of 3.9 weight percent phenyl hydrogen maleate based on the weight of the catalyst free resin. The mold containing the desired quantities of fiberglass mats, was preheated at 150°–155° C., and was clamped by a hydraulic press. The fiberglass mats were type AKM available from PPG Industries, Inc., Pittsburgh, PA. An exothermic curing reaction ensued raising the temperature to 175°–185°. The composite plaques were demolded when the mold returned to its initial preheated temperature. The overall cycle was about 4–7 minutes. The mechanical properties and the fiberglass content in weight percent, based on the weight of the cured composite, of the compositions were as follows:

| EXAMPLES | 8 | 9 | 10 |
| --- | --- | --- | --- |
| Fiberglass content (wt %) | 47 | 50 | 62 |
| Flexural Modulus (psi $\times 10^{-6}$) | 1.69 | 1.93 | 2.2 |
| Flexural Strength (psi $\times 10^{-3}$) | 35.6 | 33.6 | 36.5 |
| Tensile Modulus (psi $\times 10^{-6}$) | 1.3 | 1.46 | 1.67 |
| Tensile Strength (psi $\times 10^{-3}$) | 21.6 | 22.9 | 25.6 |
| Percent Elongation | 2.2 | 1.95 | 2.0 |
| HDT (264 $\times$ psi $\times$ °C.) | >260 | >260 | >260 |
| Notched Izod (ft-lb/in) | 22 | 27 | 35 |

Examples 11–18 further illustrate the use of the composition of the reaction in molding by a hand technique.

EXAMPLE 11–12

The catalyst solution was prepared by dissolving 1 part of concentrated sulfuric acid in 9 parts of phenol. To the resin described in Example 4 was added the catalyst solution so that the liquid composition contained 0.2 weight percent sulfuric acid based on the weight of the catalyst free resin. The catalyzed resin was thoroughly mixed by hand and poured onto glass mats (Type AKM) contained in an aluminum foil bag. The foil bag was then placed in a mold, pressurized to 300 psi with nitrogen, and heated in a hydraulic press at 150°–160° C. An exothermic reaction ensued and the content of the mold reached about 180° C. After the exotherm subsided, it was cooled to about 150° C. and the mold opened. Smooth glossy surfaced composite plaques were obtained.

The plaques were tested by the above mentioned procedures and the results of the tests, the glass content in weight percent based on the weight of the cured composite and the total time the resin was cured at a temperature above 150° C. are summarized below.

|  | EXAMPLE 11 | EXAMPLE 12 |
| --- | --- | --- |
| Glass Content (wt %) | 38 | 40 |
| Flexural Modulus (psi $\times 10^{-6}$) | 1.05 | 1.4 |
| Flexural Strength (psi $\times 10^{-3}$) | 24.9 | 36.7 |
| Tensile Modulus (psi $\times 10^{-6}$) | 1.21 | 1.59 |
| Tensile Strength (psi $\times 10^{-3}$) | 13.8 | 21.1 |
| HDT (264 $\times$ psi $\times$ °C.) | >260 | >260 |
| Notched Izod (ft-lb/in) | 14 | 20 |
| Total time at temp. >150° C. (min) | 10 | 7 |

EXAMPLE 13–15

Diethylene glycol modified resin described in Example 5 was admixed with different catalysts and poured onto glass mats as described in Examples 11–12. The weight percent glass content, based on the cured composite, and the particular catalyst used and its concentration in weight percent, based on the weight of the catalyst free composition, are shown in the table below. The cure temperature profile is shown as three temperatures; the temperature to which the mold was set at the beginning of the curing process, the highest temperature encountered during the exotherm after the resin was injected, and the temperature to which the mold was cooled and at which it was opened after the exotherm had subsided. The time at cure temperature refers to the time the temperature in the mold was within the temperature profile.

|  | EXAMPLE 13 | EXAMPLE 14 | EXAMPLE 15 |
| --- | --- | --- | --- |
| Catalyst (wt. %) |  |  |  |
| Chlorosulfonic Acid | 0.2 | 0.2 | — |
| Boron trifluoride etherate | 0.15 | — | 0.2 |
| Sulfuric Acid | — | — | 0.2 |
| Cure Temp. Profile (°C.) | 160-175-160 | 160-174-164 | 158-165-163 |
| Time at Cure Temp. (min) | 5 | 3 | 6 |
| Glass content (wt %) | 35.5 | 37 | 49 |

EXAMPLE 16-17

The furfural modified resin described in Example 7 was admixed with a sulfuric acid catalyst solution to a concentration level of 0.2 parts by weight of concentrated sulfuric acid per 100 parts of resin. The molding condition at which these examples were conducted are as those described in Examples 11-12. The cure temperature profile, cure time and weight percent glass content of the compositions are given below.

|  | EXAMPLE 16 | EXAMPLE 17 |
| --- | --- | --- |
| Cure Temp. (°C.) | 151-173-167 | 150-167-165 |
| Time at Cure Temp. (min) | 5 | 6 |
| Glass content (wt %) | 35.5 | 46.5 |

EXAMPLE 18

The p-Cresol modified prepolymer described in Example 6 was admixed with the catalyst solution to a concentration level of 0.2 weight percent of concentrated sulfuric acid, based on the catalyst free resin. A fiberglass reinforced composite was molded by the method described in Examples 11 and 12. The cure temperature profile was 157-186-171; and was held at within these temperatures for about 6 minutes. The glass content was 41 weight percent.

EXAMPLE 19

Composite plaques were made as described above and tested for impact loading properties. Tests were also run on composites made from a commercially available vinyl ester and a commercially available isophthalic polyester for comparison.

The testing apparatus was a rheometric high speed impact tester comprising a 0.5 inch diameter weighted ram with a hemispherical nose. The ram impacts at a known velocity a sample composite plaque clamped over a steel plate with a 3 inch diameter circular cutout. The apparatus is equipped with a load cell so that the impact force may be measured. Various samples of a composite composition of constant thickness and glass content were tested and the impact force and the deflection, the distance the ram penetrated the plate, were measured. The ram speed was 5 miles/hour. From this data the maximum impact force ($F_{max}$) that a particular composition of a certain thickness and glass content could absorb was determined. It was found that $F_{max}$ varied approximately with the inverse square of the composite sample, composition and glass content being equal. Therefore, a Coefficient Of Rupture (COR) was used for comparison purposes, where $$COR = F_{max}/t^2$$

$F_{max}$ is defined above and t is the thickness of the sample.

Composite plaques tested were made essentially in the manner described in Examples 1 and 8 to 10 using the hemiformal containing resoles described above in a liquid injection process. Plaques were also made using a sheet molding compounds method with a vinyl ester thermosetting composition commercially available from Dow Chemical Company, Midland, Mich. under the name of "Derkane". Plaques were also made using a sheet molding compounds method with a isophthalic polyester thermosetting composition commercially available from United States Steel Corporation, Pittsburgh, Pa. under the designation "MR 14017". The glass content of the plaques was set as near a standard 65 weight percent as possible and the thickness near 100 mils. The plaques were reinforced with the Type AKM glass fiber described above. The above plaques were tested at room temperature (20°-30° C.) and in an environmental chamber at −35° C. on the above-described test apparatus. The COR was calculated for the plaques made from hemiformal resoles (Resole) of the invention, the commercial vinyl ester and the commercial isophthalic polyester (polyester) compositions. In Table I are summarized the results. Shown are the COR for each temperature and the glass content in weight percent of the indicated composite plaques.

TABLE I

| Thermosetting Composition | Wt. % Glass | COR (lb/in² 10³) | |
| --- | --- | --- | --- |
|  |  | 20-30° C. | −35° C. |
| Polyester | 68 | 151.5 | 185.6 |
| Vinyl Ester | 67 | 120.2 | 133.3 |
| Resole | 66.5 | 141.5 | 157.6 |

As shown by the above data the impact properties of composites made from the hemiformal containing resoles of the invention have impact properties comparable to commercially available materials. This is surprising since the composites of phenolic-type resins having such a high glass content would generally be expected by one of average knowledge in the art to have significantly inferior properties to those shown.

EXAMPLE 20

Four composites of differing composition were tested for comparison purposes. Composites made from a polyester and a vinyl ester thermosetting composition and composites according to the present invention as described in Example 19 were made as described except the glass content was 60 weight percent. Also made by a sheet molding compounds process was a composite made from a conventional bulk molding phenolic composition available from General Electric Company under the designation Genal GF 7031P. The glass type and content of this composition is unknown. It represents a typical bulk molding phenolic type composition currently available commercially. The four described composites were tested, and the results summarized on Table II. The tests were carried out as described above. The flammability test used was UL-94. A V-0 designation represents the best non-flammability rating for that test. The results show physical properties of the composites of the invention markedly superior to composites made from the conventional phenolic bulk compound. Its physical properties are comparable to the polyester and vinyl ester but it shows a much better flammability resistance than those.

EXAMPLE 21

Composite sample plaques were made as described in Examples 1 and 8 to 10 and tested for tension-tension fatigue. A tension-tension fatigue test comprises subjecting the sample to a variable tensile load. In the test used the plaques were placed in standard tensile bars as are used in ASTM D-638 with a four inch gauge length and a width of one-half inch. Using servo-hydraulic equipment the plaques were subjected to varying periodic tensile load of sinusoidal nature that varied between a known maximum load ($T_{max}$) and a minimum load of 5% of the maximum load. The frequency of the load was 5 Hz. Tests were run until 1,000,000 periods were applied or until the sample being tested failed. If the sample survived 1,000,000 periods it was subjected to tests to determine its residual properties. The residual properties tested were the tensile modulus, tensile strength and percent elongation using the above described procedures. Three plaques were made essentially as described in Examples 1 and 8 to 10 except the glass content is as shown in Table III. In Table III is also shown a summary of tests of the three samples. Shown are the number of cycles to failure. The maximum tensile load ($T_{max}$) and the residual properties.

As shown in Table III the samples plaques survived 1,000,000 cycles and showed reasonable residual properties. The results of the above tests showed that the composites can be made from the hemiformal containing resoles of the invention having excellent tension-tension fatigue properties. Similar tests using composite plaques made from the polyester and vinyl ester as in Example 20 show that the composite plaques according to the invention have properties comparable to polyester and vinyl ester plaques. This is surprising in light of the general recognition in the art the composites of phenolic-type resins generally have inferior impact properties. This is demonstrated by the low notched Izod (generally less than one ft.lb/in) that is typical of commercially available phenolic composites of the prior art, generally more than an order of magnitude less that obtained by the composites of the invention, up to 35 ft.lb/in. It would be expected that a composite having as low a notched izod as the commercial phenolic composites of the prior art would fail well before one million cycles in a tension-tension fatigue test.

The hemiformal containing resole resins and composites of the invention represent a major advance in the art. Composites can be made that are equal to the sturdy polyester and vinyl ester-type composites in commercial use. The composites of the invention, however, have the additional advantage of being flame resistant whereas polyesters and vinyl esters readily burn.

TABLE II

| Thermosetting Composition | Flex. Modulus (PSI × 10$^6$) | Flex. Strength (PSI × 10$^3$) | Tensile Strength (PSI × 10$^3$) | % Elong. | Notched Izod (Ft. lb/In) | Flammability (UL-94) |
|---|---|---|---|---|---|---|
| Vinyl Ester | 1.75 | 45 | 30.0 | 2.0 | 23 | BURNS |
| Polyester | 1.75 | 40 | 28.0 | 1.75 | 18 | BURNS |
| Resole of Invention | 1.75 | 33 | 23.0 | 2.0 | 35 | V-O |
| Conventional Phenolic | 1.8 | 15.0 | 9.0 | — | 0.45 | V-O |

TABLE III

| Wt. % Glass | $T_{max}$ (psi × 10$^3$) | Cycles to Failure | Residual Properties | | |
|---|---|---|---|---|---|
| | | | Tensile modulus (psi × 10$^6$) | Tensile Strength (psi × 10$^3$) | Elongation |
| 58 | 10 | >10$^6$ | 1.81 | 21.9 | 1.25 |
| 59 | 8 | >10$^6$ | 1.92 | 30.1 | 1.85 |
| 59 | 7 | >10$^6$ | 1.77 | 29.3 | 1.95 |

We claim:
1. A phenol formaldehyde resin for use in a liquid injection molding process having a viscosity at 25° C. of from about 1000 centipoise to about 10,000 centipoise and containing less than about 5 weight percent unbound water and volatile organic compounds, said phenol formaldehyde resin having the general formula:

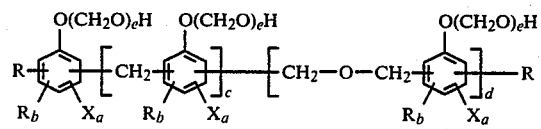

wherein a is from 0 to 3, b is 0 to 1, the sum of a and b does not exceed 3, the sum of c and d is from 2 to about 20, the mole fraction d/(c+d) is 0.4 to 0.9, e is 0 to about 5, R is —CH$_2$O(CH$_2$O)$_e$H, X is a monovalent radical, wherein for at least one of the R or —O(CH$_2$O)$_e$H group e is at least 1, and wherein at least 50 mole percent of the

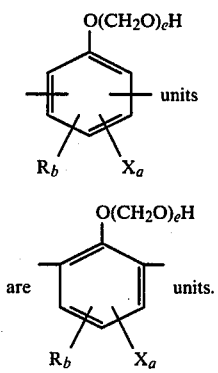

2. A phenol formaldehyde resin as defined in claim 1 wherein the mole fraction d/(c+d) is about 0.6 to about 0.8.

3. A phenol formaldehyde resin as defined in claim 1 wherein X is a monovalent radical selected from alkyl of from about 1 to about 18 carbon atoms, cycloalkyl of from 5 to 8 carbon atoms, aryl containing from 1 to about 3 aromatic rings, aralkyl, alkaryl, alkoxy containing from 1 to about 18 carbon atoms, aroxy containing from 1 to 3 aromatic nuclei, halide, alkyl sulphide having from 1 to about 18 carbon atoms and aryl sulphide having from 1 to about 3 aromatic nuclei.

4. A phenol formaldehyde resin as defined in claim 1 for use in liquid injection molding (LIM).

5. A phenol formaldehyde resin as defined in claim 1 for use in reaction injection molding (RIM).

6. A phenol formaldehyde resin as defined in claim 1 for use in hydrajecting.

7. A phenol formaldehyde resin as defined in claim 1 for use in resin transfer molding (RTM).

8. A process for preparing a phenol formaldehyde resin for use in a liquid injection molding process having a viscosity at 25° C. of from about 1000 centipoise to about 10,000 centipoise and containing less than 2 weight percent unbound water and volatile organic compounds, said phenol formaldehyde resin having the general formula:

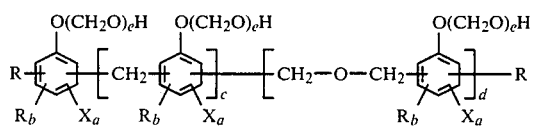

wherein a is from 0 to 3, b is 0 to 1, the sum of a and b does not exceed 3, the sum of c and d is from 2 to about 20, the mole fraction $d/(c+d)$ is 0.4 to 0.9, e is 0 to about 5, R is $-CH_2O(CH_2O)_eH$, X is a monovalent radical, wherein for at least one of the R or $-O(CH_2O)_eH$ groups e is at least 1, and wherein at least 50 mole percent of the

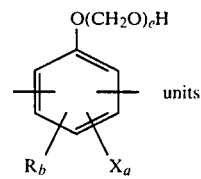 units

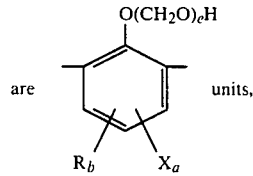 are units, said process comprising reacting a substituted or unsubstituted phenol and formaldehyde under azeotropic distillation conditions in the presence of a divalent metal catalyst in amounts sufficient to form the phenol formaldehyde resin.

9. A process as defined in claim 8 wherein at least 50 mole percent of the substituted phenol has both ortho-positions free.

10. A process as defined in claim 8 wherein the substituted or unsubstituted phenol is phenol per se.

11. A process as defined in claim 8 wherein the total formaldehyde to total phenol molar ratio is from about 1.2:1 to about 2:1.

12. A process as defined in claim 8 wherein the total formaldehyde to total phenol molar ratio is from about 1.5:1 to about 1.8:1.

13. In a liquid injection process wherein a liquid thermosetting resin is injected directly into a mold, the improvement comprising the use of the liquid resin of claim 1.

* * * * *

UNITED STATES PATENT AND TRADEMARK OFFICE
CERTIFICATE OF CORRECTION

PATENT NO. : 4,578,448
DATED : March 25, 1986
INVENTOR(S) : George L. Brode and Sui-Wu Chow It is certified that error appears in the above-identified patent and that said Letters Patent is hereby corrected as shown below:

Col 1, line 24, "dissolved" should read --dissolve --.

Col 6, line 56, "aldehyde" should read --aldehydes --.

Col 8, line 68, "data" should read --date --.

Claim 1, line 4 "about 5" should read -- about 2 --.

Signed and Sealed this

Fifth Day of August 1986

[SEAL]

Attest:

DONALD J. QUIGG

Attesting Officer

Commissioner of Patents and Trademarks